(12) United States Patent  
Garner et al.

(10) Patent No.: US 8,592,696 B2
(45) Date of Patent: Nov. 26, 2013

(54) GAME CARCASS HANGER AND RELEASABLE WEIGHING APPARATUS

(75) Inventors: Glenn A. Garner, Pine Mountain, GA (US); Tracy Brian Hare, Pine Mountain, GA (US)

(73) Assignee: Glenn A. Garner, Pine Mountain, GA (US)

( * ) Notice: Subject to any disclaimer, the term of this patent is extended or adjusted under 35 U.S.C. 154(b) by 476 days.

(21) Appl. No.: 13/023,749

(22) Filed: Feb. 9, 2011

(65) Prior Publication Data
US 2012/0199403 A1 Aug. 9, 2012

(51) Int. Cl.
*G01G 21/00* (2006.01)
*A22B 1/00* (2006.01)
*A22B 5/06* (2006.01)
*A22C 15/00* (2006.01)

(52) U.S. Cl.
USPC ............ 177/126; 177/245; 294/81.5; 294/97; 452/191; 452/192

(58) Field of Classification Search
USPC ............ 294/81.5, 97; 452/191, 192; 177/126, 177/127, 245
See application file for complete search history.

(56) References Cited

U.S. PATENT DOCUMENTS

| 1,813,600 | A | 7/1931 | Aubol |
| 2,256,123 | A | 9/1941 | Medigovich |
| 3,395,768 | A | 8/1968 | Benbow |
| 5,593,113 | A * | 1/1997 | Cox ............................ 244/137.1 |
| 6,264,544 | B1 | 7/2001 | Mullins |
| 6,560,913 | B1 * | 5/2003 | Liao .................................... 43/5 |
| 2012/0199404 | A1 * | 8/2012 | Garner .......................... 177/245 |

* cited by examiner

*Primary Examiner* — Randy W Gibson
(74) *Attorney, Agent, or Firm* — Thomas/Horstemeyer, LLP

(57) ABSTRACT

Carcass support frame 12 is supported by hanger support pin 38 of hanger 14. When a carcass has been mounted to the mounting hooks 32 and 33 of the carcass support frame, the hunter can move the scale connector lever 18 downwardly so that the scale tends to lift the carcass support frame 12 upwardly off the hanger support pin 38, causing the scale to bear the full weight and indicate the weight of the carcass.

7 Claims, 3 Drawing Sheets

GAME CARCASS HANGER AND RELEASABLE WEIGHING APPARATUS

FIELD OF THE INVENTION

This invention concerns carcass hangers for dressing wild game such as deer, hog, and other large game, and for weighing the wild game before and/or after the dressing process.

BACKGROUND OF THE DISCLOSURE

Once a wild animal has been taken, hunters usually desire to weigh and dress the carcass in the field as opposed to transporting the carcass to a storage facility where the carcass may be dressed and weighed at a later time. In general, there are problems with expedient dressing and weighing of game in the field. For example, it is desirable to avoid contact of the carcass with the ground during the dressing process since it is difficult to reach all surfaces of a carcass lying on the ground, and it is desirable to avoid contamination of the carcass meat by engaging the ground.

To avoid having the carcass engage the ground during the dressing procedure, game hangers, sometimes known as "gambrels", have been used that comprise hooks or other connection devices that grasp the carcass and a rope is used to lift the connection device so as to suspend the carcass above the ground for harvesting the carcass.

Further, it is desirable to weigh the game carcass in the field, before and/or after dressing the carcass.

Once the game carcass has been elevated for field dressing and it is desirable to weigh the carcass, the hunter is likely to want to weigh the carcass twice, once to obtain the total weight of the fully intact game carcass as killed in the wild, and then again after the game carcass has been properly dressed. The hunter is likely to have to lower the carcass from the hanger between the weighing and dressing procedures to connect and disconnect a scale to the game hanger, requiring multiple lifts of the carcasses. In the situation where heavy carcasses are to be dressed and weighed, this becomes an onerous and undesirable activity.

Hanging devices for game carcasses have been developed for suspending the carcasses above ground for dressing and also for weighing the carcasses. Such carcass suspending and weighing devices are disclosed in U.S. Pat. Nos. 2,256,123, 3,395,786 and 6,264,544.

Some of the prior art carcass hangers and weighing devices incorporate a scale with the connecting hooks used to lift the carcass, so that the lifting and weighing of the carcass are performed simultaneously. As the carcass is lifted, the scale begins its weighing function. While it is desirable to have the scale weigh the carcass, it would be desirable to separate these functions so as to avoid damaging the scale and to avoid movement of the carcass due to movements allowed by the weighing functions.

Thus, there is a need to provide an improved carcass hanger that can provide a means for lifting the carcass for the purpose of dressing the carcass, and a weighing scale for the purpose of weighing the carcass before and after dressing, with the carcass hanger being of a convenient size and structure for use in conditions in the field where the hunter has taken the carcass.

SUMMARY OF THE DISCLOSURE

Briefly, this disclosure concerns a carcass hanger, generally known as a gambrel, that may be used for lifting and suspending wild game carcasses and for weighing the carcasses before and after dressing, all with a single raising of the carcasses.

This disclosure concerns a carcass hanger that includes a carcass support frame with an upper portion and a lower portion, carcass mounting members at the lower portion of the carcass support frame that are shaped for mounting an animal carcass to the carcass support frame, and a hanger for supporting the upper portion of the carcass support frame from a higher structure. A lost motion connector may be positioned between the hanger and the upper portion of the carcass support frame. The lost motion connector includes a first position for directly supporting the weight of the carcass and the carcass support frame on the hanger, and a second position for applying the weight of the carcass and the support frame to a scale. A scale may be used that includes an upper portion supported by the hanger and a scale connector is configured for releasably attaching the lower portion of the scale to the lower portion of the carcass support frame. The scale connector is constructed for lifting the carcass support frame with respect to the hanger via the lost motion connector. This applies the entire weight of the carcass to the scale.

When a carcass is to be dressed and weighed in the field, the hanger is attached to an overhead support that could be a limb of a tree or a fabricated structure. Hocks of the legs of the carcass attach to the carcass mounting members of the carcass support frame. Typically, the carcass dressing and weighing apparatus will be suspended from an overhead structure by means of a rope extending over a pulley, with the pulley attached to the overhead structure. The hunter can mount the carcass dressing and weighing apparatus to the wild game carcass, then lift the carcass by pulling on the rope that extends over the pulley. Once the rope is tied off, the carcass may be dressed and weighed without having to release the carcass between the dressing and weighing activities.

In one embodiment of the invention, a scale is connected to the hanger and the carcass support frame is connected to the scale. A lost motion connection is formed between the hanger and the carcass support frame, and a releasable connector selectively connects the scale to the lower portion of the carcass support frame. During any time when the carcass is suspended on the carcass support frame, the hunter can connect the scale directly between the lower portion of the carcass support frame and the hanger so that all of the weight of the carcass is supported by the intermediate scale.

Conversely, when it is desirable to exclude the scale from its weighing function while the carcass is being dressed, a lever may be moved so as to lengthen the reach of the scale between the hanger and the carcass support frame so that the carcass support frame becomes supported solely by the hanger. This convenient, selective actuation of the scale provides the huntsman with the convenience of a single lifting of the carcass for both dressing and weighing, and shielding the scale from undue movements and forces during the lifting of the carcass.

DETAILED DESCRIPTION

Figure 1:
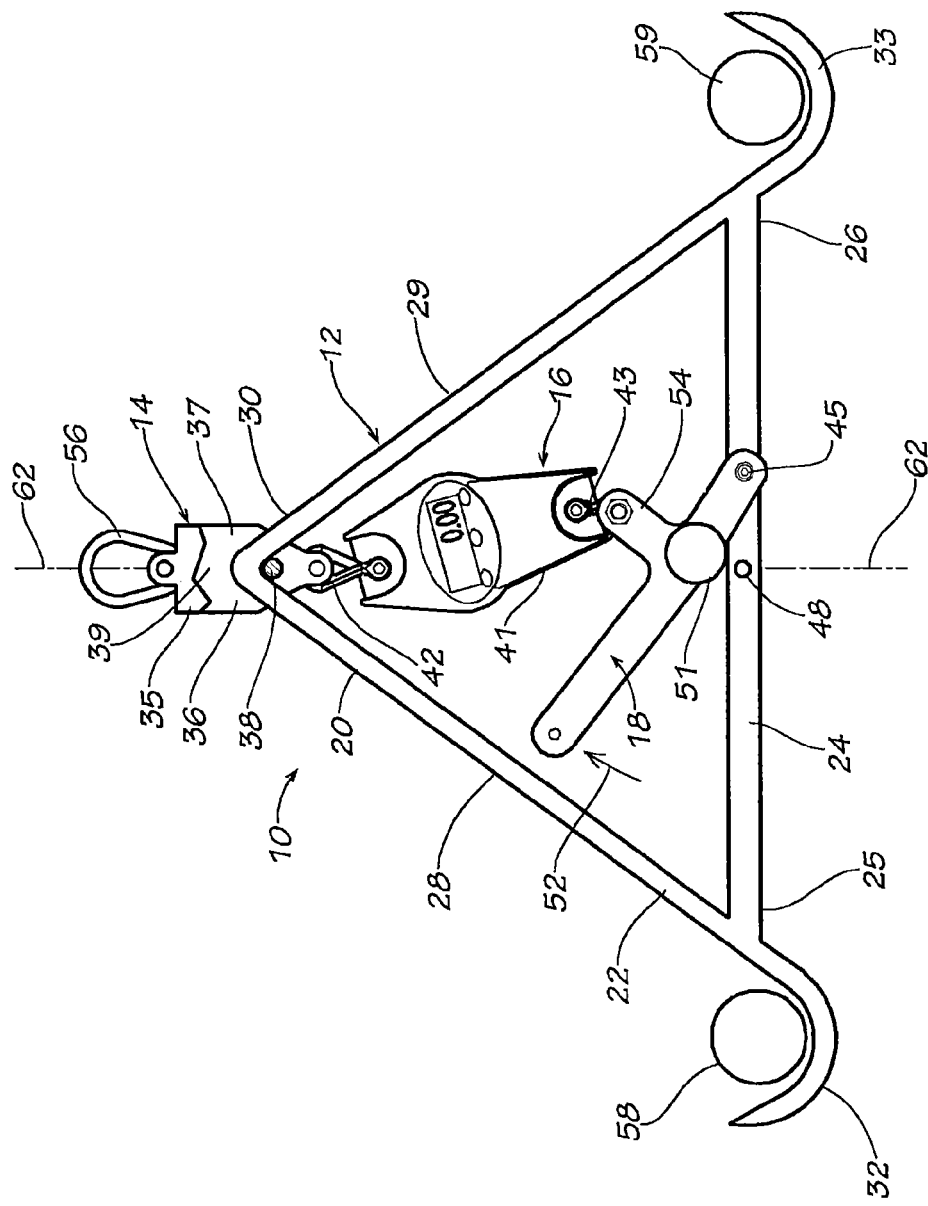
FIG. 1 is a plan view of the carcass hanger and weighing apparatus with its weighing scale deactivated

Referring now in more detail to the drawings, in which like numerals indicate like parts throughout the views, FIG. 1 illustrates a carcass hanger and weighing apparatus 10 that includes a carcass support frame 12, hanger 14, scale 16, and a lever 18 that functions as a scale connector.

In the embodiment illustrated, carcass support frame 12 is triangular shaped but can be of any shape suitable for its intended purposes. In this embodiment, the carcass support frame 12 includes, generally, an upper portion 20 and a lower portion 22, with the lower portion including a laterally extending base leg 24 with opposed end portions 25 and 26. A pair of inclined side legs 28 and 29 extend from the opposed end portions 25 and 26 of the laterally extending base leg 24, sloped upwardly and inwardly toward an apex 30 where they may be joined together to form a downwardly facing frame support surface 31. The laterally extending base leg 24 and the pair of side legs 28 and 29 form a substantially equilateral triangle; however, the support frame may be formed in other shapes as may be desired.

Mounting hooks 32 and 33 are supported at the opposed end portions of the laterally extending base leg 24 and the hooks face upwardly for receiving the hocks 58, 59 or other portions of a wild game carcass. The mounting hooks 32 and 33 function as mounting members for supporting a suspended carcass, as is conventional in the practice.

Figure 4:
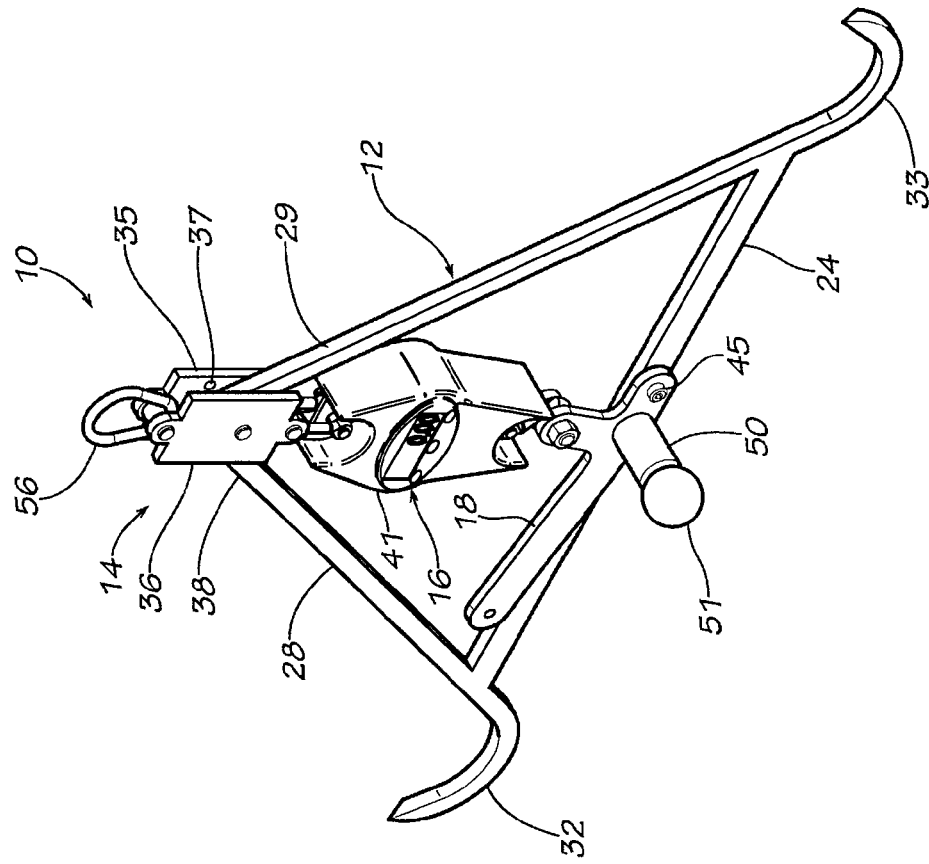
FIG. 4 is a perspective view of the carcass hanger and weighing apparatus.
Figure 3:
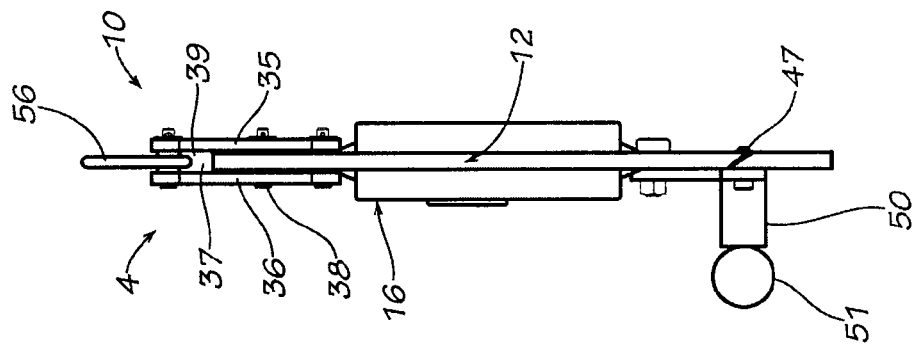
FIG. 3 is a side view of the carcass hanger and weighing apparatus.

Hanger 14 includes a pair of hanger plates 35 and 36 that are parallel and spaced from one another (as shown in FIGS. 3 and 4), forming a hanger plate space 37 between them, with the hanger plate 36 being broken away in FIG. 1 to expose the hanger plate space 37. Hanger support pin 38 extends through the hanger plates 35 and 36 and through hanger plate space 37.

As shown in FIG. 1, the upper portion of the carcass support frame 12 has its apex 30 extending over the upper surface of the hanger support pin 38 so that downwardly facing frame support surface 31 (FIG. 2) of the apex 30 supports the full weight of the carcass support frame 12 and any carcass 58, 59 suspended therefrom.

Figure 2:
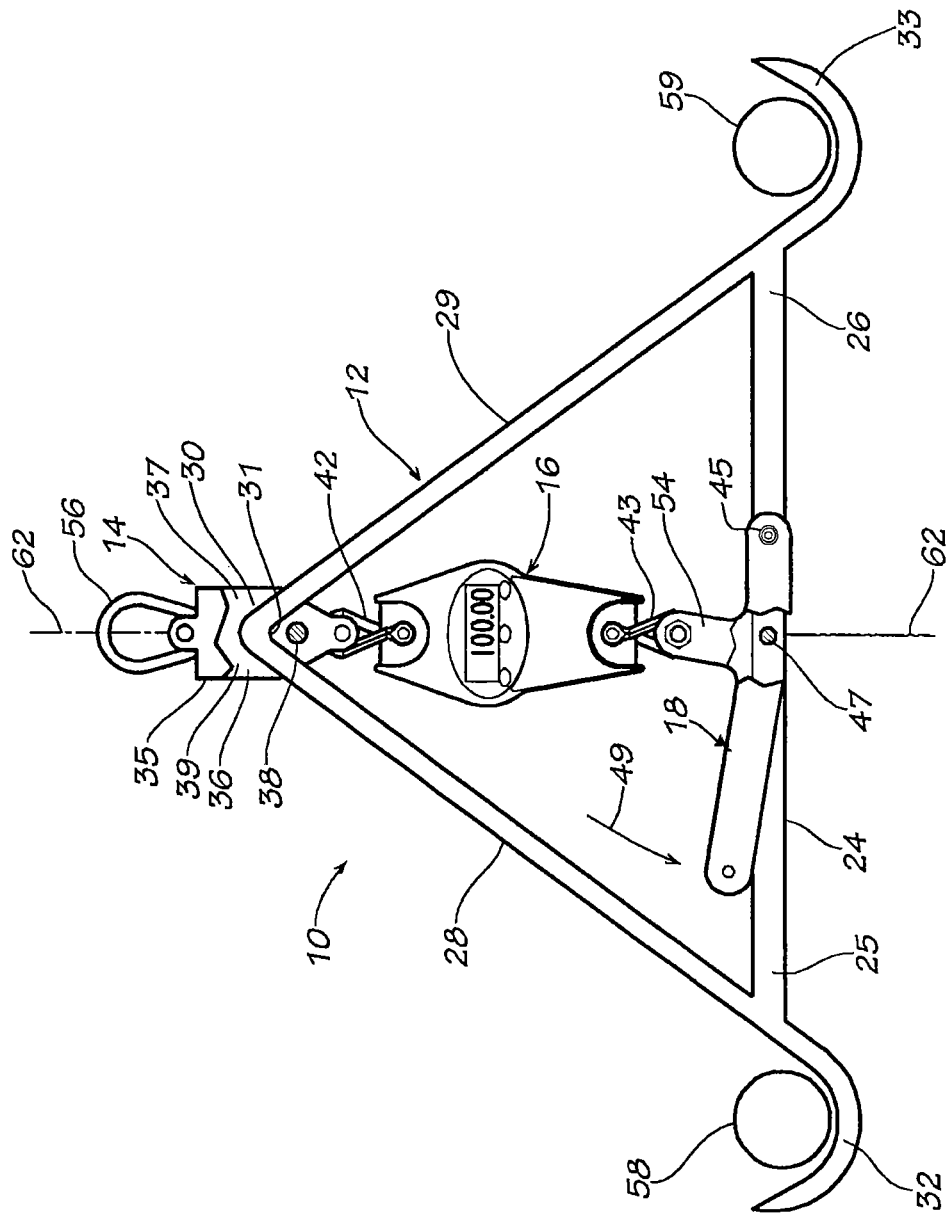
FIG. 2 is a front view of the carcass hanger and weighing apparatus of FIG. 1, but showing the weighing scale activated.

The location of the hanger support pin 38 is low enough in the hanger plate space 37 so that there is space 39 above the apex 30, allowing the carcass support frame 22 to move upwardly a short distance, as shown by comparing the positions of the apex 30 in FIGS. 1 and 2. This forms a "lost motion connection" between the carcass support frame 12 and the hanger 14.

Scale 16 is positioned in the interior space of the triangular shaped carcass support frame 12. As shown in FIG. 1, the scale 16 includes a scale housing 41 having connector wires 42 and 43 at its upper and lower end portions, respectively. The upper connector wire 42 extends upwardly from the scale housing 41 in a loop positioned in the space 37 between the hanger plates 35 and 36 and around the connector pin 38 at the lower portion of the hanger plates 35, 36 so that the loop of the connector wire 42 is received between the hanger plates 35 and 36, beneath the hanger support pin 38.

Lower connector wire 43 is connected to the scale connector 18. Scale connector 18 is shaped in the form of a lever 46 having a pivot pin 45 at one end that is out of alignment with the vertical axis 62 of the carcass support frame 12 and that functions as a fulcrum for the lever. A spring activated locking pin 47 extends through an opening in the lever of the scale connector 18 at a position spaced from the pivot pin 45, so that the spring activated locking pin is movable in an arc toward or away from alignment with the vertical axis 62 of the carcass support frame 12. As shown in FIG. 2, when the lever is moved in the downward arc as indicated by the arrow 49 the spring activated locking pin 47 moves toward alignment with the vertical axis 62 of the carcass support frame and registers with the locking pin receptacle 48 (FIG. 1). The locking pin 47 is biased by a coil compression spring (not shown) in the tubular housing 50 (FIGS. 3 and 4) into the locking pin receptacle 48. A knob 51 is connected to the spring actuated locking pin 47 so that it may be conveniently withdrawn by the fingers of the hunter to unlock the lever 18 so that the lever may be moved in an upward arc to the position shown in FIG. 1, as shown by the arrow 52.

Right angle arm 54 extends from lever 18 toward scale housing 41 and is connected at its distal end to the lower portion of the scale housing by connector wire 43.

Operation

When the huntsman uses the carcass hanger and weighing apparatus 10 to hang and weigh an animal carcass, the usual procedure is for the carcass to be moved to an overhead support, such as a structured device or a limb of a tree, with a rope extending over the structured device or limb and extending downwardly and tied to the loop 56 of the hanger 14.

The carcass support frame 12 may be connected to the animal carcass by placing the hocks 58 and 59 of the carcass in the upwardly facing mounting hooks 32 and 33, with the pointed ends of the mounting hooks being used as may be desirable in engaging the carcass. Once the carcass has been engaged firmly by the carcass support frame 12, the rope (not shown) that is connected to the loop 56 of the hanger 14 is drawn tight and lifts the carcass support frame 12 upwardly with the carcass suspended below the carcass support frame. Typically, the carcass will be lifted high enough so that it does not still engage the ground surface.

As the carcass is being engaged and lifted by the carcass hanger and weighing apparatus 10, scale connector lever represented by lever 18 will have been lifted in the direction as indicated by arrow 52 of FIG. 1 in the upward direction, to pivot about its pivot pin 45. This creates some slack in the connection wires 42 and 43 (FIG. 1) at the opposite ends of the scale 16. Also, this allows the downwardly facing frame support surface 31 at the apex 30 of the carcass support frame 12 to rest on the hanger support pin 38 of the hanger 14 so that the entire weight of the carcass will be applied through the carcass support frame 12 to the support pin 38 of hanger 14.

When the carcass has been raised by the carcass hanger and weighing apparatus 10, the carcass will be in a suspended situation suitable for dressing, harvesting, etc.

When it is desired to weigh the carcass, the hunter does not have to lower the carcass to the ground to connect a scale to the carcass support frame. The hunter grasps the lever 18 and pivots the lever from the upwardly extending position shown in FIG. 1, in the direction indicated by arrow 49 of FIG. 2, toward the more horizontal position shown in FIG. 2. Typically, the hunter will squeeze the top surface of the lever 18 and the bottom surface of the laterally extending base leg 24 so as to avoid applying weight to the carcass support frame 12. In the meantime, the hunter pulls the knob 51 so as to retract the spring actuated locking pin 47 until the lever 18 is approaching a parallel position with respect to the laterally extending base leg 24 of the carcass support frame 12. Once the spring actuated locking pin 47 is aligned with the laterally extending base leg, the hunter can release the knob 51 and the spring actuated locking pin 57 will find the locking pin receptacle 48, thereby locking the lever 18 in a more parallel orientation with respect to the laterally extending base leg 24 of the carcass support frame 12.

As the lever 18 is moved in the direction indicated by arrow 49 (FIG. 2), the right angle arm 54 of the lever moves in a downward arc to a lower position that is aligned more vertically with the scale 16 and hanger 14. This movement causes tension to be applied by the lever 18 through the scale 16 and into the hanger 14, thereby shortening the distance between the hanger 14 and the laterally extending base leg 24 of the carcass support frame 12. This lifts the apex 30 of the carcass support frame 12 upwardly with respect to the hanger 14, thereby lifting the carcass support frame 12 at its apex 30 off of the support pin 38. This upward lost motion connection between the hanger 14 and the carcass support frame relieves the weight of the carcass from being applied to the support pin 38 so that the support of the carcass is borne vertically through the hanger 14, downwardly through the scale 16, to the spring actuated locking pin 47, laterally through the laterally extending base leg 24, and out to the mounting hooks 32 and 33 and the hocks 58 and 59 of the animal carcass.

It can be seen from FIG. 2 that the scale 16 is moved into vertical alignment beneath the hanger 14 and the central portion of the laterally extending base leg 24 of the carcass support frame 12, so that the scale now supports the weight of the carcass and can accurately register the weight of the carcass.

Once the weight of the carcass has been determined as described above, the hunter may reverse the movement of the scale connector lever 18 by grasping the lever and urging it toward a parallel relationship with respect to the laterally extending base leg 24 to relieve the force applied on the spring actuated locking pin 47. The hunter then pulls on the knob 51 to withdraw the spring actuated locking pin 47 from its locking pin receptacle 48, and then releases the lever 18 so that the weight of the carcass is no longer applied directly to the scale 16 but the weight urges the carcass support frame 12 downwardly until the downwardly facing frame support surface 31 at the apex 30 of the carcass support frame comes to rest on the hanger support pin 38 of hanger 14.

While the carcass support frame 12 has been shown as a triangle, other shapes may be used, as may be desired. The carcass support frame may be fabricated as an integral structure or an assembly of multiple pieces. Further, the dimensions of the scale connector lever 18 and the scale may be modified so as to increase or decrease the lost motion movement of the apex 30 of the carcass support frame 12 above the support pin 38 of the hanger 14.

For example, the pivot pin 45 of the scale connecting lever 18 may be moved farther away from the vertical center line 62 so as to increase the vertical movement of the connection of the right angle arm 54 of the scale connector lever, thereby increasing the movement of the lost motion connection between the carcass support frame 12 and the hanger 14.

Although a preferred embodiment of the invention has been disclosed in detail herein, it will be obvious to those skilled in the art that variations and modifications of the disclosed embodiment may be made without departing from the spirit and scope of the invention as set forth in the following claims.

The invention claimed is:

1. A carcass hanger and weighing apparatus comprising:
   a hanger,
   a carcass support frame including a laterally extending base leg with opposed end portions and a pair of side legs sloped upwardly and inwardly from said opposed end portions of said base leg and supported by said hanger with a lost motion connection including a down position for supporting the weight of the carcass by the hanger and an up position for relieving the weight of the carcass on the hanger,
   a scale connected to said hanger, and
   releasable connector means configured for releasably attaching said scale to said laterally extending base leg of said carcass support and lifting said carcass support frame off said hanger.

2. The carcass hanger and weighing apparatus of claim 1, and further including carcass mounting members supported at said opposed end portions of said base leg for mounting an animal carcass to said carcass support frame.

3. The carcass hanger and weighing apparatus of claim 1, wherein said carcass support frame is configured to be urged toward said support element by the weight of the animal carcass.

4. The carcass hanger and weighing apparatus of claim 1, wherein said releasable connector means comprises a lever having a pivotal end connected to said laterally extending base leg of said carcass support frame and a distal end connected to said scale for lifting said carcass support frame off of said hanger such that the weight of the carcass is supported by said scale.

5. A carcass hanger and weighing apparatus comprising:
   a carcass support frame including an upper portion and a lower portion,
   carcass mounting members at said lower portion of said carcass support frame shaped for mounting an animal carcass to said carcass support frame,
   a hanger for supporting the upper portion of said carcass support frame from a higher structure,
   a lost motion connector positioned between said hanger and said upper portion of said carcass support frame, said lost motion connector including a first position for directly supporting the weight of the carcass and said carcass support frame on the hanger and a second position for relieving the weight of the carcass and carcass support frame on the hanger,
   a scale including an upper portion supported by said hanger, and,
   a scale connector means configured for releasably attaching said scale to the lower portion of said carcass support frame and lifting said carcass support frame with respect to said hanger.

6. The carcass hanger and weighing apparatus of claim 5, wherein said scale connector comprises a lever having a pivotal end connected to said lower portion of said carcass support frame and a distal end connected to said lower portion of said scale for lifting said upper portion of said carcass support frame off of said hanger such that the weight of the carcass is supported by said scale.

7. A carcass hanger and weighing apparatus comprising:
   a carcass support frame including an upper portion and a lower portion,
   support means at said lower portion of said carcass support frame for mounting an animal carcass to said carcass support frame,
   a hanger for supporting the upper portion of said carcass support frame from a higher structure,
   a lost motion connector connected between said hanger and said upper portion of said carcass support frame such that said upper portion of said carcass support frame is movable downwardly into supported relationship with said hanger or upwardly in non-supported relationship with said hanger,
   a scale including an upper portion and a lower portion, said upper portion of said scale supported by said hanger, and, a scale connector means configured for releasably attaching lower portion of said scale to said carcass support frame and holding said carcass support frame out of supported relationship with said hanger.

* * * * *